(12) United States Patent
Liu et al.

(10) Patent No.: US 9,375,976 B1
(45) Date of Patent: Jun. 28, 2016

(54) WHEEL WITH Y-SHAPED SPOKE CONFIGURATION

(71) Applicant: HONDA MOTOR CO., LTD., Tokyo (JP)

(72) Inventors: David S. Liu, Powell, OH (US); Parminder S. Rooprai, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 14/664,706

(22) Filed: Mar. 20, 2015

(51) Int. Cl.
*B60B 1/06* (2006.01)

(52) U.S. Cl.
CPC .............. *B60B 1/06* (2013.01); *B60B 2900/111* (2013.01); *B60B 2900/133* (2013.01); *B60B 2900/572* (2013.01)

(58) Field of Classification Search
CPC ...... B60B 1/06; B60B 2900/133; B60B 3/007
See application file for complete search history.

(56) References Cited

U.S. PATENT DOCUMENTS

| | | | |
|---|---|---|---|
| 361,914 A | 4/1887 | Wing | |
| 6,042,194 A * | 3/2000 | Fitz | B60B 1/10 29/894.34 |
| 6,837,549 B2 | 1/2005 | Ito et al. | |
| 6,896,336 B2 * | 5/2005 | Hodges | B60B 21/04 301/95.101 |
| 7,059,685 B2 * | 6/2006 | Kermelk | B21D 53/26 301/63.101 |
| D620,862 S | 8/2010 | Pollmann | |
| D624,861 S | 10/2010 | Zhao | |
| 7,922,261 B2 * | 4/2011 | Gartner | B60B 1/08 301/95.101 |
| D645,390 S | 9/2011 | De Bono | |
| D661,239 S | 6/2012 | Pollmann et al. | |
| D675,143 S | 1/2013 | Gebert et al. | |
| D684,912 S | 6/2013 | Yamashita | |
| 2011/0241415 A1 | 10/2011 | Mikura | |

FOREIGN PATENT DOCUMENTS

EP 2208621 A1 7/2010

* cited by examiner

*Primary Examiner* — John Walters
*Assistant Examiner* — James Triggs
(74) *Attorney, Agent, or Firm* — Kenealy Vaidya LLP

(57) ABSTRACT

A wheel includes a rim having an outer radius, $R_1$, extending from a center point of the wheel to an outer edge of the rim, and a hub having an outer radius, $R_2$, extending from the center point of the wheel to an outer edge of the hub. The hub is positioned coaxially with the rim and has a plurality of circumferentially positioned and equiangularly spaced bolt holes for attachment of the wheel to the vehicle. The wheel further includes a plurality of equiangularly spaced, Y-shaped spokes having a trunk portion contacting the hub, two limb portions each contacting the rim, and a branch point at which the trunk portion and limb portions converge. The spokes extend radially outward from the hub to the rim. The bolt holes are interspaced between the trunk portions. A distance between the center point of the wheel and the branch point is $D_1$.

20 Claims, 7 Drawing Sheets

WHEEL WITH Y-SHAPED SPOKE CONFIGURATION

BACKGROUND

The disclosure relates, in general, to a wheel for a motor vehicle.

The design of a wheel for a motor vehicle can have a number of implications for the appearance and performance of the vehicle itself. For example, the design of a wheel can affect fuel economy, vehicle handling, road noise, aesthetics, as well as a number of other factors. In general, a wheel for a motor vehicle may include a central hub portion including bolt holes or other features to enable the wheel to be mounted on to an axle of a vehicle such as with bolts or nuts. The wheel may also include a disk or spokes that extend between the hub and a rim portion of the wheel. The rim portion may include outboard and inboard flanges for mounting a tire.

With respect to wheel design, it is generally desirable to improve the overall performance of a vehicle by reducing the weight of the wheel while maintaining the lateral stiffness of the wheel, which can have an effect on the dynamic response of the vehicle. However, a reduction in wheel weight may often result in a decrease in lateral stiffness. Factors that contribute to the lateral stiffness of a wheel may include the distance from the hub of the wheel to the rim, the number and type of spokes or other connection between the hub and the rim, the thickness of the various wheel components, and so forth. For example, a wheel with more spokes or thicker spokes may results in a wheel with greater lateral stiffness.

In another aspect, it is generally desirable to improve road noise performance by separating first and second modes of wheel natural frequency from a tire cavity resonance area. In general, a number of factors may contribute to the noise level with a cabin or passenger compartment of a motor vehicle. For example, sources of cabin noise associated with the wheel of a motor vehicle can include external noise produced when the tire of a wheel meets the road surface. More particularly, a tire mounted to the rim of a wheel may define an acoustic cavity with a characteristic frequency based at least partially on an average radius of the cavity. The sound that is produced in the air cavity inside the wheel is the result of a standing wave being excited which is related to the natural frequency (resonance frequency) of the wheel.

Some wheel designs call for one or more additional components in order to reduce the natural frequency sounds in wheels that originate in the acoustic air cavity inside the wheel. One example method for suppressing sound inside wheels includes the use of a sound-absorbing material or one or more resonators arranged in connection to the sound absorbers inside the tire. Other example devices include a sound shield that is placed on the outside of the wheel or resonators placed in the wheel housing. However, these devices may add to the production and material cost of the wheel as well as increase the overall weight of the wheel.

SUMMARY OF THE INVENTION

The present disclosure overcomes the aforementioned drawbacks by providing a wheel for a motor vehicle having a Y-shaped spoke configuration. In accordance with one embodiment of the present disclosure, the wheel design includes an annular wheel rim having a first outer radius, $R_1$, extending from a center point of the wheel to an outer edge of the wheel rim, and an annular wheel hub having a second outer radius, $R_2$, extending from the center point of the wheel to an outer edge of the wheel hub. The wheel hub is positioned coaxially with the wheel rim and has a plurality of circumferentially positioned and equiangularly spaced bolt holes for attachment of the wheel to the motor vehicle. The wheel further includes a plurality of equiangularly spaced, Y-shaped spokes having a trunk portion contacting the wheel hub, two limb portions each contacting the wheel rim, and a branch point intermediate the trunk portion and limb portions. The spokes extend radially outward from the wheel hub to the wheel rim. In one aspect, the bolt holes are interspaced between the trunk portions of the spokes. In another aspect, the trunk portion and the limb portions converge at the branch point. In yet another aspect, a distance between the center point of the wheel and the branch point is $D_1$. In still another aspect, $R_2/R_1$ is between about 0.2 and about 0.4. In a further aspect, $D_1/R_1$ is between about 0.4 and about 0.6. In another aspect, an internal angle between the two limb portions of each Y-shaped spoke is between about 100 degrees and about 120 degrees.

In accordance with another embodiment of the present disclosure, a wheel for a motor vehicle includes an annular wheel rim having a body extending between a first end and a second end. The first end and second end of the wheel rim shaped to mount a tire. The body of the wheel rim includes an exterior surface at least partially defining an acoustic cavity with the tire. The wheel further includes an annular wheel hub positioned coaxially with the wheel rim and having a plurality of circumferentially positioned and equiangularly spaced bolt holes for attachment of the wheel to the motor vehicle. The wheel further includes a plurality of equiangularly spaced, Y-shaped spokes having a trunk portion contacting the wheel hub, two limb portions each contacting the wheel rim, and a branch point intermediate the trunk portion and limb portions. The spokes extend radially outward from the wheel hub to the wheel rim. In one aspect, the acoustic cavity has a characteristic frequency range between an upper frequency bound and a lower frequency bound. In another aspect, a second natural frequency mode of the wheel is greater than the upper frequency bound. In a further aspect, a first natural frequency mode of the wheel is less than the lower frequency bound.

In yet another embodiment of the present disclosure, a wheel for a motor vehicle includes an annular wheel rim and an annular wheel hub positioned coaxially with the wheel rim and having a plurality of circumferentially positioned and equiangularly spaced bolt holes for attachment of the wheel to the motor vehicle. The wheel further includes a plurality of equiangularly spaced, Y-shaped spokes having a trunk portion contacting the wheel hub, two limb portions each contacting the wheel rim, and a branch point intermediate the trunk portion and limb portions. The spokes extend radially outward from the wheel hub to the wheel rim. In one aspect, a total weight of the wheel is less than about 11 kg. In another aspect, a lateral stiffness of the wheel is at least about 4000 kN/mm.

The foregoing and other aspects and advantages of the disclosure will appear from the following description. In the description, reference is made to the accompanying drawings which form a part hereof, and in which there is shown by way of illustration a preferred embodiment of the disclosure. Such embodiment does not necessarily represent the full scope of the disclosure, however, and reference is made therefore to the claims and herein for interpreting the scope of the disclosure.

BRIEF DESCRIPTION OF THE DRAWINGS

Like reference numeral will be used to refer to like parts from figure to figure in the following detailed description.

DETAILED DESCRIPTION

Figure 1:
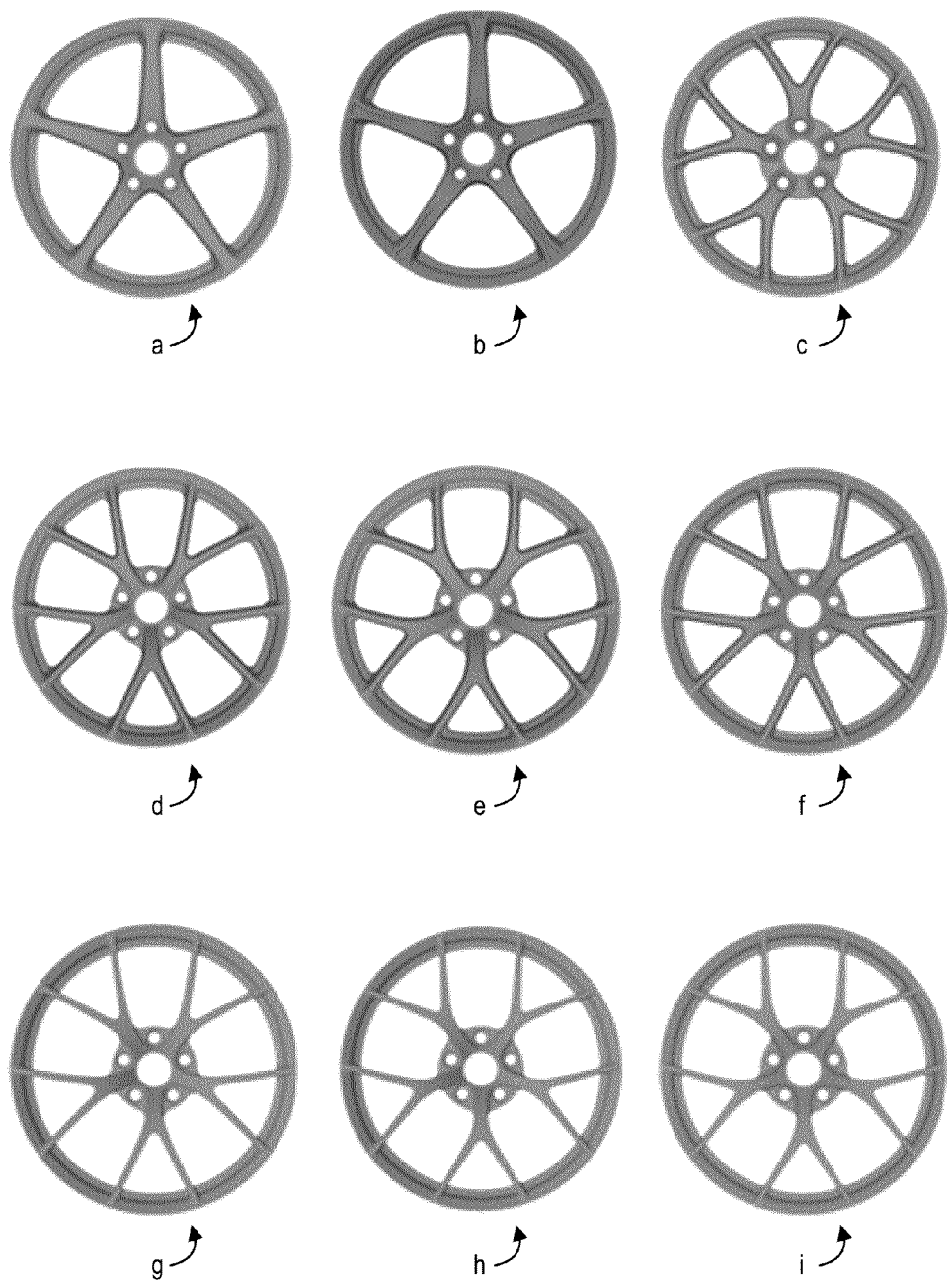
FIG. 1 is a front elevation view of different iterations of wheel configurations considered in identifying a wheel for a motor vehicle according to the present disclosure.

The present disclosure is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the disclosure.

As also discussed above and in various situations is may be useful to provide a wheel for a motor vehicle that meets a given set of performance and appearance specifications. For example, it may be useful to provide a wheel having a total weight that is less than a maximum specified weight. Accordingly it may be possible to reduce the thickness of various components of the wheel or to use lighter weight materials to form the wheel. However, a reduction in wheel weight may correspond to a reduction in lateral stiffness, which in turn may have an effect on vehicle performance such as dynamic response. In another example it may be useful to provide a wheel having a given set of acoustic properties in order to meet certain specifications with respect to an amount of road noise generated by the wheel in combination with a tire during operation of a motor vehicle. Accordingly, it may be useful to equip the wheel with additional components such as resonator cavities or sound insulation materials. However, these materials may add to the material and production costs associated with the wheel.

Given the impact of wheel design on the performance and appearance of a motor vehicle, there is a need to provide a wheel for a motor vehicle having a reduced weight without compromising lateral stiffness. In another aspect, there is a need to provide a wheel for a motor vehicle where one or more of the wheel natural frequencies are separated from the frequency range associated with the acoustic cavity formed by the wheel in combination with a tire. Moreover, there is a need to separate the wheel natural frequencies from the frequency range associated with the acoustic cavity with the need for additional components installed in or on the wheel.

Use of embodiments of the disclosed wheel for a motor vehicle may address these and other issues. For example, a wheel for a motor vehicle may include a wheel rim, a wheel hub positioned coaxially with the wheel rim, and a plurality of Y-shaped spokes connecting the wheel rim to the wheel hub. In one aspect, the wheel may include a set of five Y-shaped spokes equiangularly spaced around the wheel hub. Each of the Y-shaped spokes may include a trunk portion contacting the wheel hub and two limb portions contacting the wheel rim. Each of the points of contact between the limb portions and the wheel rim may be equiangularly spaced. In another aspect, a set of five equiangularly spaced bolt holes may be positioned in the wheel hub and spaced between the trunk portions of the Y-shaped spokes. In yet another aspect, the dimensions of the wheel, such as the distance radius of the hub, the radius of the rim and the Y-spoke offset may contribute to characteristics of the wheel such as weight, lateral stiffness and acoustical characteristics.

In some embodiments the design of the wheel may be configured to provide a wheel for a motor vehicle having an overall weight less than a maximum specified weight. For example, a maximum specified weight may be about 12 kilograms (kg), and the wheel may have an overall weight of less than about 11 kg. In one aspect, the maximum specified weight of the wheel may be specified based on a diameter of the wheel. In one example, a first embodiment of a wheel may have a diameter of about 0.48 meters (about 19 inches) and a total weight of less than about 12 kg. In one aspect, the first embodiment of the wheel may have a total weight of less than about 11 kg. In another aspect, the first embodiment of the wheel may have a total weight of less than about 9.6 kg. In another example, a second embodiment of a wheel may have a diameter of about 0.51 meters (about 20 inches) and a maximum specified weight of less than about 15 kg. In one aspect, the second embodiment of the wheel may have a total weight of less than about 14 kg. In another aspect, the second embodiment of the wheel may have a total weight of less than about 12.1 kg.

In some embodiments, the wheel may have a weight that is less than a maximum specified weight while also achieving a minimum specified lateral stiffness. As described above, the maximum specified weight may be specified based on a diameter of the wheel or the intended placement of the wheel on a vehicle (e.g., front, rear, passenger side, driver side). Accordingly, the minimum specified lateral stiffness may depend on the diameter or placement of the wheel. In one example, a lateral stiffness for a first embodiment of a wheel having a diameter of about 0.48 meters (about 19 inches) may be at least about 3000 kiloNewton per millimeter (kN/mm). In one aspect, the first embodiment of the wheel may have a lateral stiffness of at least about 3300 kN/mm. In another aspect, the first embodiment of the wheel may have a later stiffness of a least about 3600 kN/mm. In another example, a lateral stiffness for a second embodiment of a wheel having a diameter of about 0.51 meters (about 20 inches) may be at least about 3600 kN/mm. In one aspect, the second embodiment of the wheel may have a lateral stiffness of at least about 4000 kN/mm. In another aspect, the second embodiment of the wheel may have a later stiffness of a least about 4400 kN/mm. Accordingly, embodiments of a wheel for a motor vehicle according to the present disclosure may meet both a maximum overall weight and minimum lateral stiffness specification.

In some embodiments, in order to achieve a given weight or lateral stiffness, the wheel may be suitable cast, forged, machined, or otherwise fabricated from any suitable material. For example the wheel may include a metal composition such as silicon, iron, copper, manganese, aluminum, magnesium, chromium, zinc, vanadium, titanium, bismuth, gallium, lead, zircon and mixtures and alloys thereof. In one embodiment, the wheel may be cast or forged from an aluminum alloy such as a 3xx (e.g., A356), 6xxx (e.g., 6061) or 7xxx (e.g., 7075) series aluminum alloy. Moreover, in some embodiments, a wheel may be formed from non-metal components such as a polymer, a resin or another suitable material.

In some embodiments, the design of the wheel may be configured to provide a wheel for a motor vehicle having a given set of acoustical characteristics. For example, it may be useful to provide a wheel where the first and second natural frequency modes of the wheel are separated from the frequency range of the acoustic cavity formed when a tire is mounted to the wheel. In one aspect, the first and second natural frequency modes of the wheel may be determined by the dimensions of the wheel such as the overall radius of the wheel. In another aspect, the frequency ranges associated with the acoustic cavity may vary based on the dimensions of a tire mounted to the wheel. While tire shapes and sizes may vary according to the specifications of a given tire manufacturer, it may be possible to define a relevant frequency range having an upper frequency bound and a lower frequency bound. Accordingly, embodiments of a wheel according to the present disclosure may have a first natural frequency mode that is less than the lower frequency bound and a second natural frequency mode that is a greater than the upper frequency bound. Therefore, a wheel according to the present disclosure may have a reduced road noise profile as compared with a reference wheel in which the natural frequency modes of reference wheel fall with the frequency range associated with an acoustic cavity formed between the reference wheel and a tire.

In still other embodiments, a wheel for a motor vehicle may be designed to achieve multiple specifications such as wheel weight and lateral stiffness specifications in combination with acoustical performance characteristics. For example, a wheel for a motor vehicle having a diameter of about 0.51 meters (about 20 inches) may have an overall weight of less than about 11 kg, a lateral stiffness of at least about 4450 kN/mm and a first a second natural frequency mode separated from a frequency range associated with an acoustic cavity formed between the wheel and tire.

Turning now to the Figures, an embodiment of a wheel design for a motor vehicle was identified by iterating on an initial wheel design "a" as shown in FIG. 1. In one aspect, it was specified that iterations of a first embodiment of wheel "a" should have a maximum weight of less than about 9.6 kg. In another aspect, it was specified that iterations of a first embodiment of wheel "a" should have a minimum lateral stiffness of at least about 3600 kN/mm. In yet another aspect, it was specified that iterations of a first embodiment of wheel "a" should minimize wheel weight without compromising lateral stiffness (i.e., providing a wheel with a lateral stiffness of greater than about 3600 kN/mm).

In yet another aspect, it was specified that iterations of a second embodiment of wheel "a" should have a maximum weight of less than about 12.1 kg. In a further aspect, it was specified that iterations of a second embodiment of wheel "a" should have a minimum lateral stiffness of at least about 4450 kN/mm. In still another aspect, it was specified that iterations of a second embodiment of wheel "a" should minimize wheel weight without compromising lateral stiffness (i.e., providing a wheel with a lateral stiffness of greater than about 4450 kN/mm).

In addition to achieving the aforementioned wheel specifications for weight and lateral stiffness, specifications for acoustical characteristics of the wheel were also provided. In one aspect, it was specified that a first natural frequency mode and a second natural frequency mode of iterations of wheel "a" should be separated from the frequency range associated with an acoustic cavity formed between the rim of the wheel and a tire mounted to the rim. For a wheel having a diameter of about 0.51 meters (about 20 inches), a value of about 340 Hz was provided as an upper bound for the frequency range of the acoustic cavity, and a value of about 175 Hz was provided as a lower bound for the frequency range of the acoustic cavity. Accordingly, it was specified that a first natural frequency mode of iterations of wheel "a" be less than the lower frequency bound. Similarly, it was specified that a second natural frequency mode of iterations of wheel "a" be greater than the upper frequency bound. By comparison, for a wheel having a diameter of about 0.48 meters (about 19 inches), a value of about 360 Hz was provided as an upper bound for the frequency range of the acoustic cavity, and a value of about 200 Hz was provided as a lower bound for the frequency range of the acoustic cavity.

While various particular specifications were indicated for embodiments of a wheel for a motor vehicle as shown in the Figures, it will be appreciated that other specifications may be provided for wheel weight, diameter, lateral stiffness, acoustical characteristics and the like. For example, it may be useful to provide a wheel having a greater or smaller overall diameter (e.g., about 38 cm, about 41 cm, about 43 cm, etc.). Given the diameter of the wheel, it may be useful to vary the specifications for weight, or the frequency range including upper and lower frequency bounds for the acoustic cavity formed between the wheel and a tire. In one aspect, a smaller maximum weight may be specified for a smaller diameter wheel. Accordingly, the specifications described herein are used by way of illustration and are not meant to be limiting with respect to the scope of the present disclosure. Moreover, it should be noted that words of direction or orientation such as "upper", "lower", "vertical", horizontal" and the like are similarly used by way of illustration and are not meant to be limiting with respect to the scope of the present disclosure.

With reference to FIGS. 1-3, nine different wheel designs were analyzed including wheel design "a" and eight sequential iterations of wheel "a" (i.e., wheels "b" through "i"). In one aspect, wheels "a" and "b" were characterized by a five spoke design with each spoke extending continuously and unbranched from the wheel hub near the center of the wheel to the rim near the edge of the wheel. Moreover, the five bolt holes spaced around the wheel hub were aligned with the spokes. By comparison, iterations "c" through "i" included a Y-shaped spoke design. Each of the five Y-shaped spokes in iterations "c" through "i" included a trunk portion extending from the wheel hub and two limb portions extending from the wheel rim. The trunk portion and limb portions converge at a branch point with a radial offset relative to the wheel hub (i.e., the distance of the branch point from a center point of the wheel).

Between iterations "c" and "d", the location of the bolt holes was found to change relative to the spokes. In particular, the bolt holes in iterations "d" through "i" were located between the spokes as opposed to in line with the spokes as in iterations "a" though "c". In one aspect, a noted decrease in wheel weight while maintaining lateral stiffness was achieved by positioning the bolt holes between the spoke as compared with bolt holes positioned in line with the spokes. With continued reference to iterations "d" through "i", it can be seen that the overall dimensions of the wheel was varied. For example, the relative thickness dimensions of the five Y-shaped spokes changed from iteration to iteration (e.g., from "e" to "f" to "g"). In one aspect, the dimensions, spacing of the bolt holes, spoke characteristics (branched vs. unbranched) and other aspects of the wheel designs shown in FIG. 1 may contribute to the properties of the wheel such as the weight, lateral stiffness and acoustical characteristics as shown in FIGS. 2 and 3. For example, equiangular spacing of the nodes at the intersection of the wheel rim with the limbs of the Y-shaped spokes resulted in a reduction in weight without substantially reducing lateral stiffness (see e.g., wheels "h" and "i").

Figure 2A:
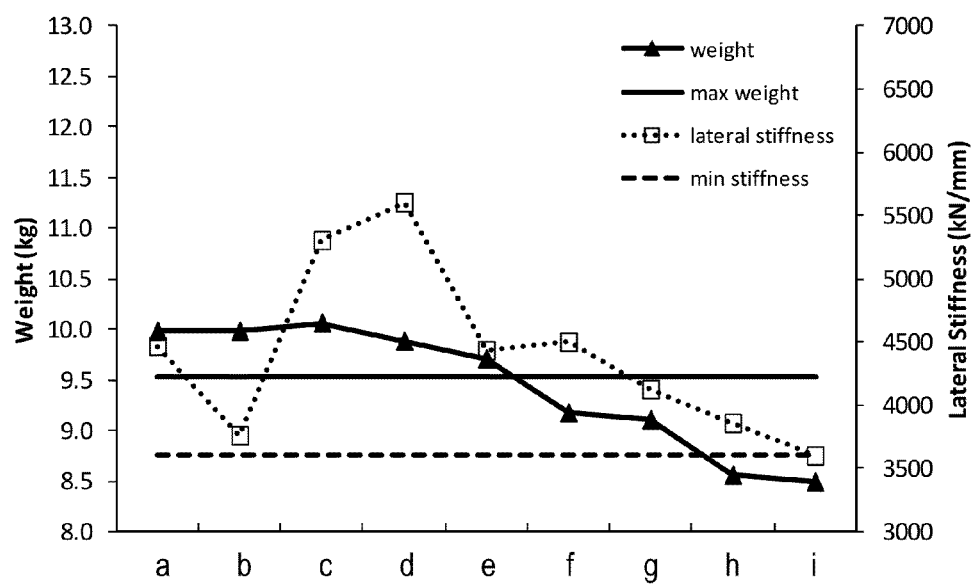
FIG. 2A is a plot of wheel weight and wheel lateral stiffness for a first embodiment of each of the wheels shown in FIG. 1.
Figure 2B:
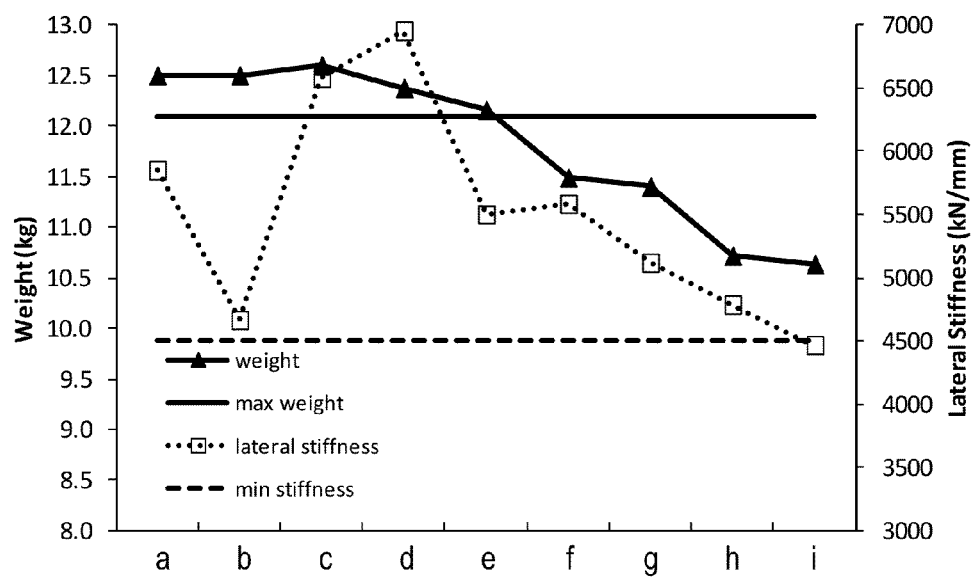
FIG. 2B is a plot of wheel weight and wheel lateral stiffness for a second embodiment of each of the wheels shown in FIG. 1.

With reference to FIGS. 2A and 2B, it can be seen that the weight and lateral stiffness of each of the wheel designs shown in FIG. 1 varied between designs. In one aspect, it may be useful to provide a wheel with an actual weight less than a specified maximum weight. In another aspect, it may be useful to provide a wheel with an actual lateral stiffness greater than a minimum lateral stiffness. In one example, the wheel weight for a first wheel varied between about 10.1 kg for wheel "c" and about 8.5 kg for wheel "i". Similarly, the lateral stiffness varied between about 5300 kN/mm for wheel "d" and about 3600 kN/mm for wheel "i". In another example, the wheel weight for a second wheel varied between about 12.6 kg for wheel "c" and about 10.6 kg for wheel "i". Similarly, the lateral stiffness varied between about 6950 kN/mm for wheel "d" and about 4470 kN/mm for wheel "i". As discussed previously, in some embodiments of a wheel for a motor vehicle, there may be a trade-off between minimizing wheel weight while maximizing or maintaining lateral stiffness. For example, as shown for a first wheel embodiment of wheel "b" and wheel "c", the change to a branched, split or Y-shaped spoke design results in an increase in lateral stiffness of about 1540 kN/mm with only an small increase in wheel weight of about 0.1 kg.

It may also be seen in FIGS. 2A and 2B for each of the Y-shaped spoke designs (i.e., wheels "c" through "i"), the lateral stiffness generally decreased with decreasing wheel weight. For example, a comparison of a first embodiment of wheel "d" with a first embodiment of wheel "i" shows a decrease in wheel weight of about 1.4 kg with a corresponding decrease in lateral strength of about 2000 kN/mm. However, a first embodiment of wheel "i" yielded the lowest overall weight of about 8.5 kg (below the maximum wheel weight specification of about 9.6 kg) and still had a lateral stiffness of about 3600 kN/mm (on target with the minimum specification for lateral stiffness of about 3600 kN/mm).

In another aspect, a comparison of a second embodiment of wheel "d" with wheel "i" shows a decrease in wheel weight of about 1.7 kg with a corresponding decrease in lateral strength of about 2490 kN/mm. However, a wheel "i" yielded the lowest overall weight of about 10.6 kg (below the maximum wheel weight specification of about 12.1 kg) and still had a lateral stiffness of about 4450 kN/mm (on target with the minimum specification for lateral stiffness of about 4450 kN/mm).

The acoustical characteristics of the wheels shown in FIG. 1 were also analyzed. In one aspect, the natural frequency of the wheel may be determined by the circumference in such a way that the circumference of the internal air cavity is equal to one wave length. Accordingly, a larger wheel with a greater circumference may have a longer wave length and a lower natural frequency. However, a number of factors may affect the natural frequency. In one aspect, the radius of the acoustic cavity may range from the exterior surface of the wheel rim to the interior surface of the tire. Moreover, the speed of the vehicle, and therefore the angular velocity of the wheel may vary. Other factors may also contribute to the value of the natural frequency of the wheel. Therefore, it may be useful to consider a range of natural frequencies where the range has an upper frequency bound and a lower frequency bound. In one aspect, the upper and lower frequency bounds may be chosen to encompass only a portion of the range of natural frequencies. In another aspect the upper and lower frequency bounds may be chosen based on the amplitude or intensity of the frequency spectrum. For example, the upper and lower frequency bounds may be chosen to encompass 90% of the total noise associated with an acoustic cavity.

In one aspect, the upper and lower bounds for tire cavity resonance area may be determined based on a mass of a tire to be mounted to the wheel, shape (e.g., dimensions, geometry) of the wheel, and other like factors. Moreover, the speed of rotation of the wheel may have an effect on the upper and lower band offset due to the Doppler Effect. In some embodiments, it may be useful to provide at least about a 50 Hz separation between a modal frequency of the wheel and the tire cavity resonance area for speeds between about 0 kilometers per hour (kph) and about 120 kph.

Figure 3A:
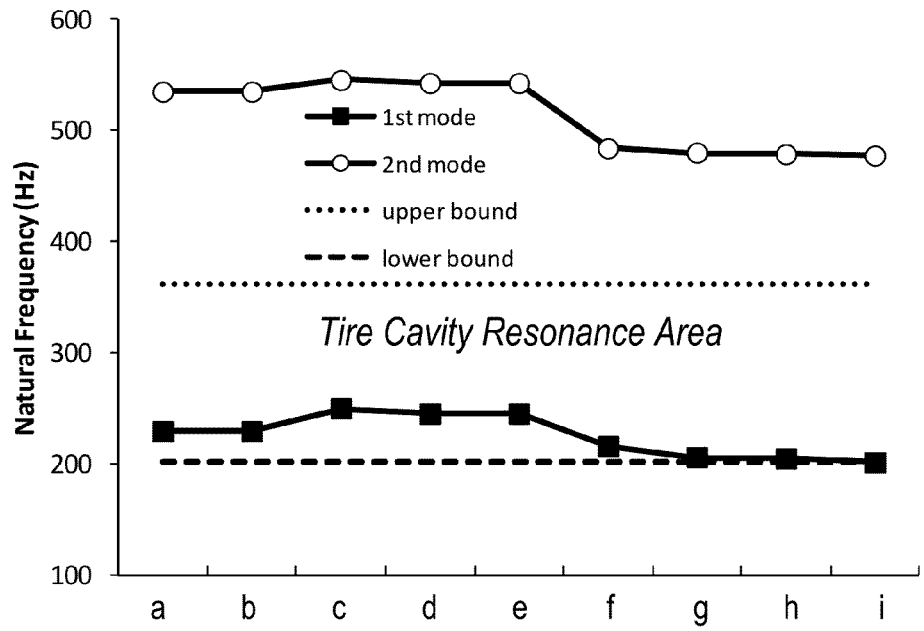
FIG. 3A is a plot of first mode and second mode wheel natural frequencies with respect to the frequency range of the acoustic cavity (tire cavity resonance area) for a first embodiment of each of the wheels shown in FIG. 1.
Figure 3B:
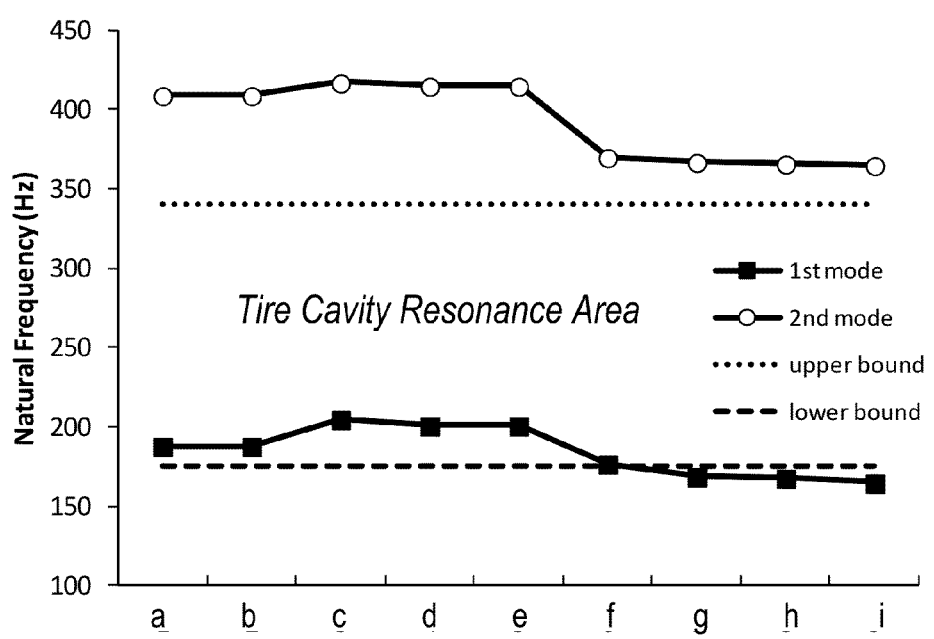
FIG. 3B is a plot of first mode and second mode wheel natural frequencies with respect to the frequency range of the acoustic cavity (tire cavity resonance area) for a second embodiment of each of the wheels shown in FIG. 1.

In one aspect, it may be useful to provide a wheel with a first and second natural frequency outside of a tire cavity resonance area for a given range of wheel speeds (kph). As shown in FIGS. 3A and 3B, it can be seen that the second mode natural frequency for each of the wheel designs was separated from the frequency range associated with the acoustic cavity formed between the wheel and a tire (tire cavity resonance area). In particular, each of the wheel designs according to the first embodiment in FIG. 3A had a second natural frequency mode above the upper frequency bound of about 360 Hz. By comparison, the first natural frequency modes for wheel designs "a" though "h" were within the natural frequency range of the acoustic cavity. More particularly, wheel designs "a" though "f" were between the upper frequency bound of about 360 Hz and the lower frequency bound of about 200 Hz. However, wheel design "i" had a first natural frequency mode at the lower bound of the frequency range. Accordingly, for the specified frequency range shown in FIG. 3A, wheel design "i" met the provided specifications for wheel acoustical properties.

Turning now to FIG. 3B, it can be seen that each of the wheel designs according to the second embodiment had a second natural frequency mode above the upper frequency bound of about 340 Hz. By comparison, the first natural frequency mode for wheel designs "a" though "f" were within the natural frequency range of the acoustic cavity. More particularly, wheel designs "a" though "f" were between the upper frequency bound of about 340 Hz and the lower frequency bound of about 175 Hz. However, wheel designs "g" through "i" had a first natural frequency mode below the lower bound of the frequency range. Accordingly, for the specified frequency range shown in FIG. 3B, wheel designs "g" through "i" met the provided specifications for wheel acoustical properties.

FIGS. 4-8 show a second embodiment of a wheel 100 according to the present disclosure. It will be appreciated that a wheel design 100 may be similarly applied for a first embodiment of a wheel design. Moreover, aspects of the present disclosure may be generally applied to alternative or additional embodiments including both front and rear wheel designs. In one aspect, wheel 100 may have similar characteristics to wheel "i" as shown in FIGS. 1-3. Wheel 100 includes a wheel hub 10, five equiangularly spaced Y-shaped spokes 12, and wheel rim 14. The hub 10 may be generally disk shaped with a central opening 16 defining a cylindrical space for mounting the wheel 100 to an axle of the motor vehicle (not shown). The spokes 12 may include trunk portion 18 extending from the opening 16 in the hub 10 and limb portions 20 extending from the trunk portion 18 and connecting to the rim 14. The trunk portion 18 and limb portions 20 may converge at a branch point 22. The hub 10 may have a generally circular perimeter or outer edge 24 extending between the trunk portions 18 of each of the spokes 12. Accordingly, in some embodiments the hub 10 may accommodate a series of bolt holes 26 spaced equiangularly between the trunk portions 18 of the spokes 12.

In one aspect, the spokes 12 may have an outer edge 28 having a curvilinear profile transitioning continuously from the hub 10 to the rim 14. The outer edge 28 of either the trunk portion 18 or the limb portions 20 may have a radius of curvature that is relatively large in order to balance the weight of the wheel with the lateral stiffness or strength the spokes 12. In one aspect, increasing the radius of curvature of the outer edge 28 may result in an increase in the weight of the wheel, whereas decreasing the radius of curvature of the outer edge 28 may result in a decrease the relative strength of the spokes 12 or the lateral stiffness of the wheel 100 in general.

In another aspect, the spokes 12 and more particularly the limb portions 20 may have an inner edge 30. The inner edges 30 may have a generally straight or slight curvilinear profile that transitions into a curvilinear profile near the branch point 22. Each of the limb portions 20 may intersect and connect to the wheel rim 14 at a point 32. In one aspect, the nodes 32 may be equiangularly spaced about the rim 14, for example, to equally disperse a tire load. The rim 14 may have a generally annular profile including an outer edge 34 and an inner edge 36. A passage 38 may be positioned in the rim 14 between the outer edge 34 and inner edge 36. In one aspect, the passage 38 may be configured to receive a valve stem.

Figure 4:
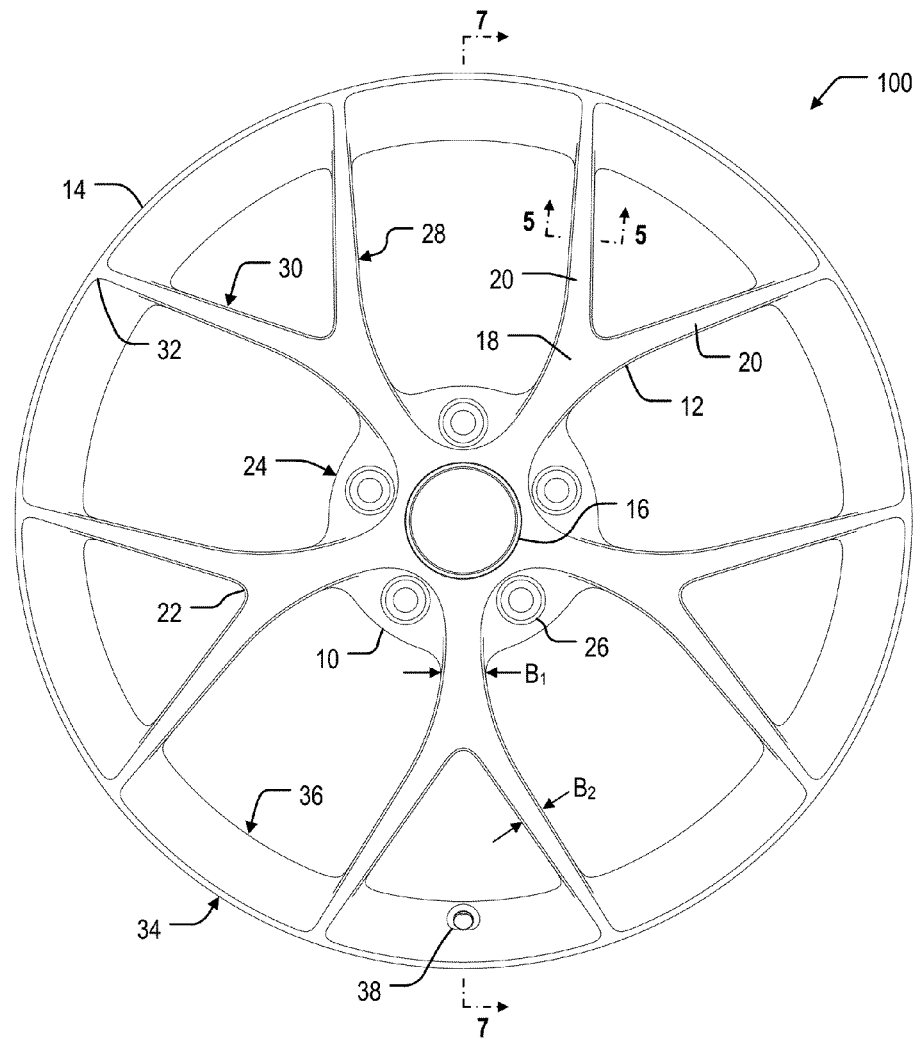
FIG. 4 is a front elevational view of one embodiment of a wheel for a motor vehicle according to the present disclosure.
Figure 5:
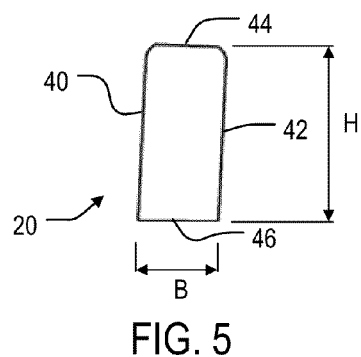
FIG. 5 is a cross-sectional plan view of a limb portion of a Y-shaped spoke of the wheel of FIG. 4 as taken along line 5-5 of FIG. 4.
Figure 6:
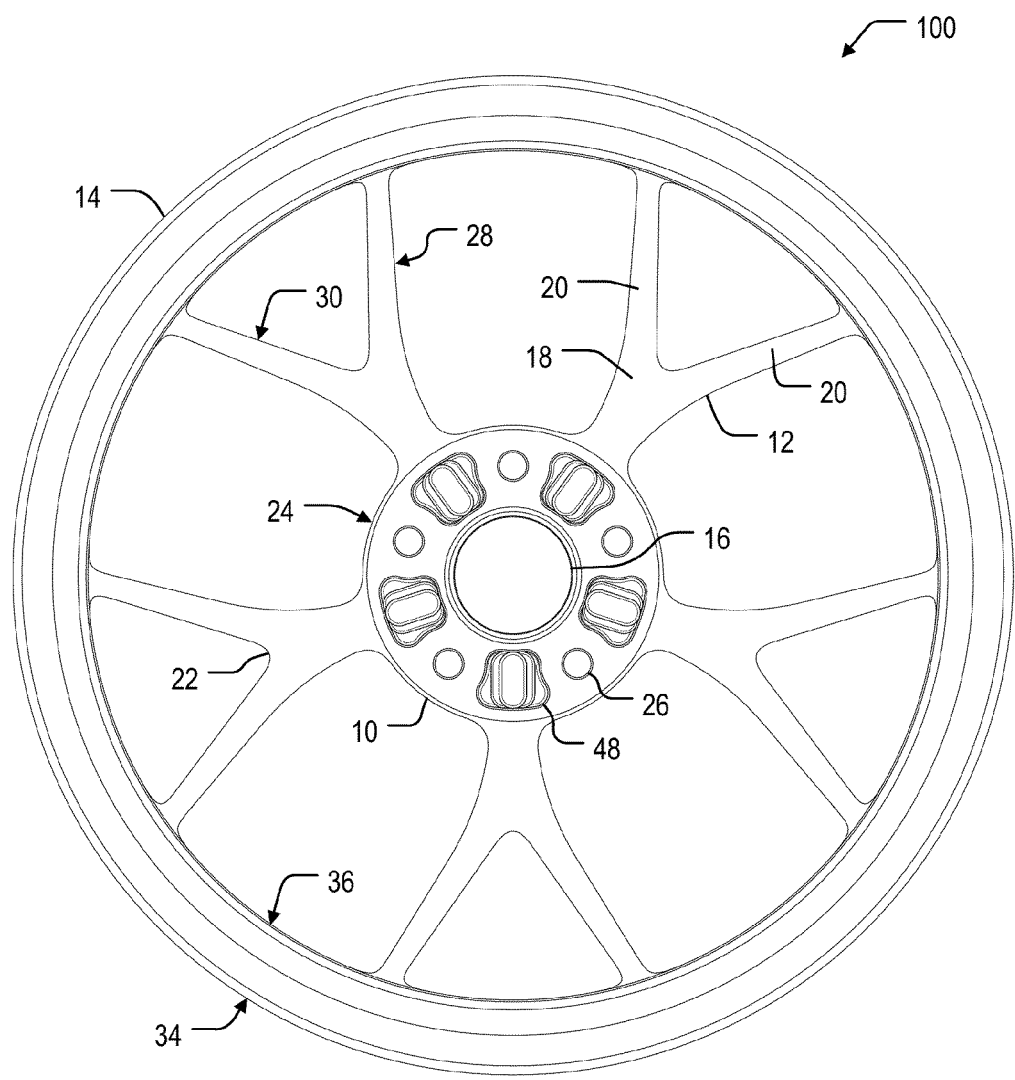
FIG. 6 is a rear elevational view of the wheel of FIG. 4.

A cross-section of a limb portion 20, as shown in FIG. 5, may have a generally rectangular profile. In one aspect, a perimeter of a cross-section of the limb portion 20 may include a first side 40, an opposed second side 42, a top side 44 corresponding to an front face of the wheel 100 as shown in FIG. 4, and a bottom side 46 corresponding to a rear face of the wheel 100 as shown in FIG. 6. In some embodiments, the intersection of first side 40 and bottom side 46 may define a right angle. Similarly, the intersection of second side 42 and bottom side 46 may define a right angle. By comparison, the intersection of first side 40 with top side 44 or the intersection of second side 42 with top side 44 may define a rounded or beveled edge. In other embodiments, first side 40 and second side 42 or top side 44 and bottom side 46 may be generally parallel. In still other embodiments, the limb portions 20 of the spokes 12 are at least partially machined.

In one aspect, it may be useful to provide a limb portion 20 having a cross-sectional profile as shown in FIG. 5. The area moment of inertia, which relates to the deflection of the limb portion 20 when under a load, is given by Equation 1:

$$I = \frac{B(H^3)}{12} \quad \text{(Eq. 1)}$$

Where I is the moment of inertia, B is the width of the cross-sectional profile, and H is the height of the cross-sectional profile. It will be appreciated that because of the relationship of I to B and H in Eq. 1, a cross-section having a greater H may generally have a greater I. In an example case where B is 5 mm and H is 2 mm, I is about 3 mm. By comparison, in a similar example case where B is 2 mm and H is 5 mm, I is about 21 mm. Accordingly, where the dimensions of two cross-sectional profiles are similar, it may be useful to select a profile in which the height is greater than the width. As shown in FIG. 5, the bending inertia of a limb portion 20 may be significantly improved over a limb portion having a generally square cross-sectional profile or a cross-section profile where a width of the profile is greater than the height.

With reference to FIG. 6, the rear face of the wheel 100 shows that the wheel hub 10 may include a recesses 48 spaced equiangularly between the bolt holes 26. In one aspect, the recesses 48 may be provided to reduce the amount of material included in the wheel and therefore contribute to an overall reduction in the wheel weight. In another aspect, recesses 48 may be sized to reduce the weight of the wheel 100 while maintaining a minimum lateral stiffness or stress tolerance.

Figure 7:
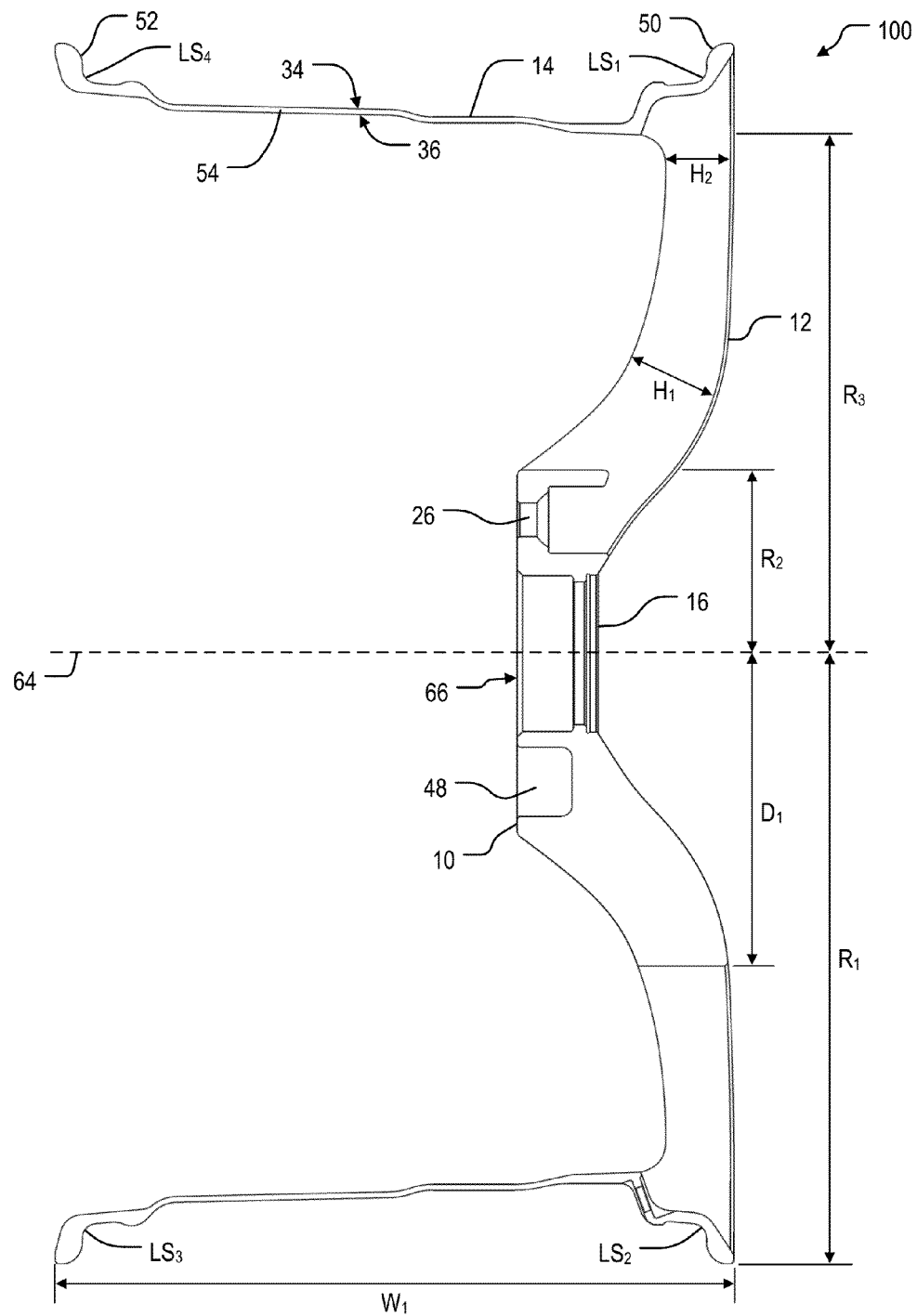
FIG. 7 is a cross-sectional plan view of the wheel of FIG. 4 as taken along line 7-7 of FIG. 4.

FIG. 7 highlights a side profile of wheel 100 including a profile of the wheel rim 14. The wheel rim 14 includes a first end 50, a second end 52 and a body 54 extending between the first end 50 and the second end 52. In one aspect, the first end 50 and the second end 52 may be shaped, such as with a flange, to mount a tire to the wheel 100. In another aspect, the profile of the body 54, which may be at least partially defined by outer edge 34 and inner edge 36, may have a stepped or variable profile. In one aspect, the profile of body 54 may be configured to contribute to properties of the wheel such as weight, lateral stiffness and acoustical properties. For example, as shown at least in FIG. 8, a tire 56 may be coupled to wheel 100 to define an acoustic cavity 58. The acoustic cavity 58 may be characterized by a tire cavity resonance area having a frequency range between an upper frequency bound and a lower frequency bound as shown, for example, in FIG. 3.

With reference to FIGS. 4 and 7, it may be useful to maximize the height dimensions of the trunk portions 18 or other portions of a wheel 100 that may experience relatively high stresses during operation. For example, as discussed above with reference to Eq. 1, it may be useful to provide a wheel 100 where $H_1$ is maximized. More generally, it may be useful to provide a wheel 100 in which the width of a given cross-sectional profile is minimized. For example, it may be useful to minimize widths such as $B_1$ and $B_2$. In yet another aspect, it may be useful to optimize the height dimensions of the limb portions 20 near the rim 14 or near other portions of the wheel 100 outside of the areas (e.g., trunk portions 18) that may experience relatively high stresses during operation. For example, it may be useful to optimize $H_2$.

In some embodiments, a width ($W_1$) of the wheel 100 may be specified. In one aspect, the width $W_1$ may vary as a function of the diameter of the wheel 100 or a radius or other dimension of the wheel 100. In one example, for a first embodiment of a wheel having a diameter of about 0.48 meters (about 19 inches), $W_1$ may be between about 15 cm (about 6 inches) and about 30 cm (about 12 inches). In one aspect, for the first embodiment of the wheel, $W_1$ may be between about 20 cm (about 8 inches) and about 25 cm (about 10 inches). In another aspect, for the first embodiment of the wheel, $W_1$ may be about 21.6 cm (about 8.5 inches). In another example, for a second embodiment of a wheel having a diameter of about 0.51 meters (about 20 inches), $W_1$ may be between about 18 cm (about 7 inches) and about 33 cm (about 13 inches). In one aspect, for the second embodiment of the wheel, $W_1$ may be between about 23 cm (about 9 inches) and about 30 cm (about 12 inches). In another aspect, for the second embodiment of the wheel, $W_1$ may be about 27.9 cm (about 11.0 inches).

Figure 8:
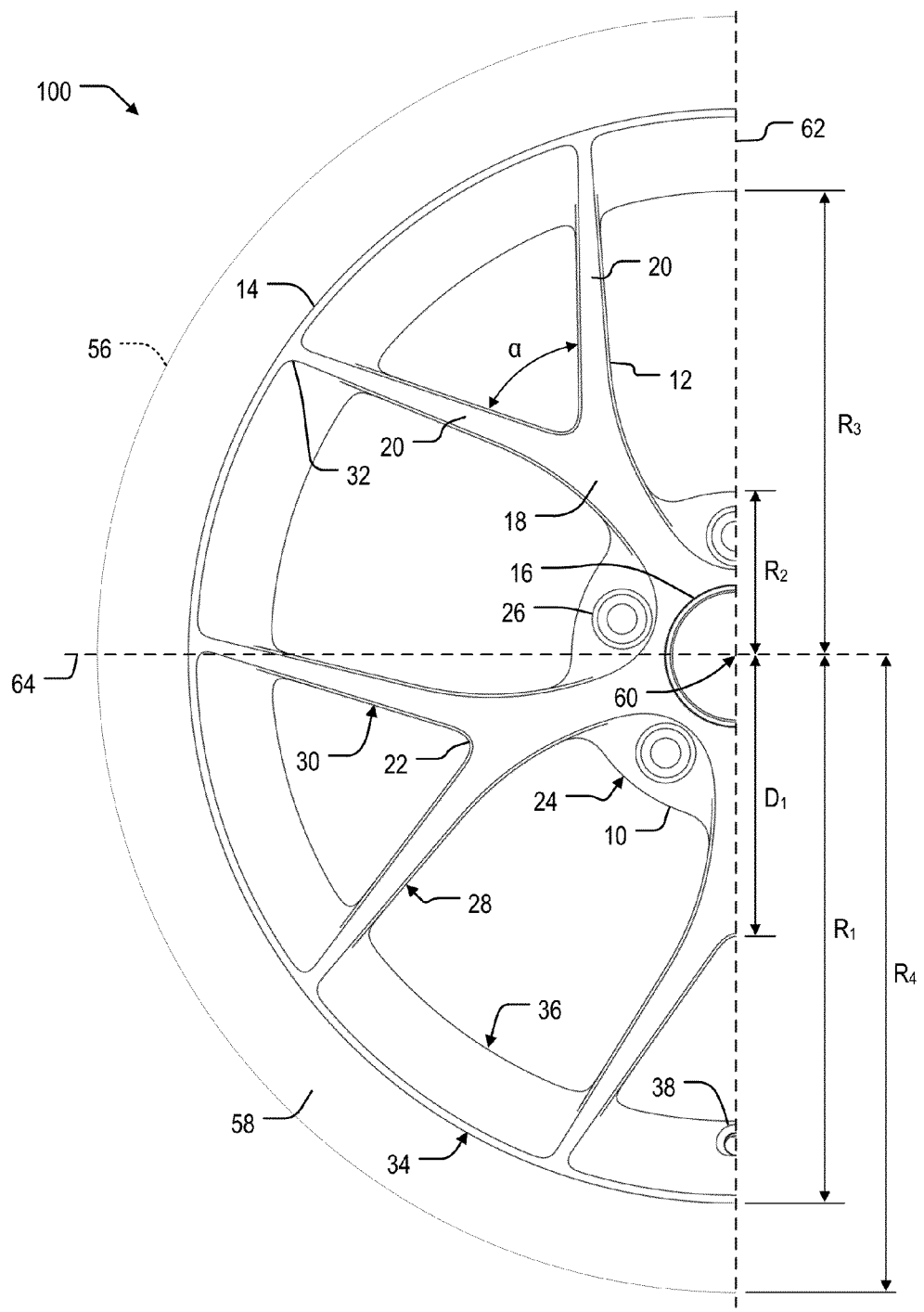
FIG. 8 is a partial front elevational view showing half of the wheel of FIG. 4.

With continued reference to FIG. 8, a number of dimensions may be defined for a wheel 100. For example, a center point 60 of wheel 100 may be defined as the intersection between a vertical bisecting line 62 and a horizontal bisecting line 64. In one aspect, line 62 and line 64 each divide the wheel 100 into two equal sides. In another aspect, line 62 may be perpendicular to line 64. A first outer radius, $R_1$, may extend from the center point 60 of the wheel 10 to the outer edge 34 of the wheel rim 14. A second outer radius, $R_2$, may extend from the center point 60 of the wheel 100 to outer edge 24 of the wheel hub 10. An inner radius, $R_3$, may extend from the center point 60 of the wheel 100 to the inner edge 36 of the wheel rim 14. A radius, $R_4$, may extend from the center point 60 of the wheel 100 to the edge of the tire 56. An internal angle, a, may exist between the two limb portions 20 of each Y-shaped spoke 12. A distance between the center point 60 of the wheel 100 and the branch point 22 may be defined as $D_1$.

In one embodiment, the ratio of $R_2$ to $R_1$ ($R_2/R_1$) may be between about 0.2 and about 0.4. In another embodiment, the $R_2/R_1$ may be between about 0.25 and about 0.35. In yet another embodiment, $R_2/R_1$ may be between about 0.30 and about 0.34. In a further embodiment, $R_2/R_1$ may be about 0.30. In still another embodiment, $R_1$ may be between about 225 mm and about 300 mm. In one example, $R_1$ may be about 261 mm. In another example, $R_1$ may be about 274 mm. In a further embodiment, $R_2$ may be between about 50 mm and about 125 mm. In one example, $R_2$ may be about 82 mm.

In one embodiment, the ratio of $D_1$ to $R_1$ ($D_1/R_1$) may be between about 0.4 and about 0.6. In another embodiment, $D_1/R_1$ may be between about 0.45 and about 0.55. In yet another embodiment, $D_1/R_1$ may be between about 0.50 and about 0.54. In one example, $D_1/R_1$ may be about 0.51. In another example, $D_1/R_1$ may be about 0.52. In still another embodiment, $D_1$ may be between about 110 mm and about 160 mm. In one example, $D_1$ may be about 135 mm. In another example, $D_1$ may be about 140 mm.

In one embodiment, α may be between about 100 degrees and about 120 degrees. In another embodiment, α may be between about 105 degrees and about 115 degrees. In yet another embodiment, α may be between about 110 degrees and about 112 degrees. In one example, α may be about 111.7 degrees. In another example, α may be about 109.8 degrees.

In one embodiment, the ratio of $R_3$ to $R_1$ (ROW may be between about 0.8 and about 0.9. In another embodiment, $R_3/R_1$ may be between about 0.82 and about 0.87. In yet another embodiment, $R_3/R_1$ may be between about 0.84 and about 0.85. In still another embodiment, $R_3$ may be between about 200 mm and about 250 mm. In one example, $R_3$ may be about 221 mm. In another example, $R_3$ may be about 233 mm.

In some embodiments, the ratio of $R_4$ to $W_1$ ($R_4/W_1$) may be between about 1.5 and about 2.5. In one aspect, $R_4/W_1$ may be about 1.8. In another aspect, $R_4/W_1$ may be about 2.2.

In some embodiments, the lateral stiffness of a wheel design may be measured using computer aided engineering (CAE) software. For example, a model of a wheel design may be rendered with the CAE software or other design software. Thereafter, the lateral point stiffness may be calculated at four different points on the wheel bead seat of the computer rendered model. With reference to FIG. 7, a computer rendered model of the example wheel 100 may be fixed in the CAE software at a mounting face 66 and the bolt holes 26, and a lateral point load may be individually applied at each of four points designated at $LS_1$, $LS_2$, $LS_3$, and $LS_4$. The average of the CAE calculations performed for each of the four points $LS_1$, $LS_2$, $LS_3$, and $LS_4$, may be used to determine the lateral stiffness. Alternatively (or additionally), the average of the outboard points $LS_1$ and $LS_2$, the average of the inboard points $LS_3$ and $LS_4$, or a combination thereof may be used to determine a lateral stiffness. Other methods of calculating a lateral stiffness for a wheel may be found in the Steel Market Development Institute (SMDI) Final Report entitled, "Lightweight Steel Wheel" published Aug. 6, 2013.

In some embodiments, various feature of a wheel for a motor vehicle as shown in the Figures may be added, modified or removed without departing the scope of the present disclosure. For example, a wheel such as wheel 100 may include any number of spokes. In some embodiments, a wheel may include an odd or even number of spokes such as from three to nine spokes. In other embodiments, a wheel may include seven spokes. In still other embodiments, the spokes may be branched or unbranched. A wheel may further include one or more design elements such as a logo, a badge, an emblem, or the like. The design may be engraved, printed, embossed or otherwise formed relative to a surface of the wheel. Other variations may be suitably included in a wheel design such as the use of a dye, colorant or coating to vary the appearance of the wheel.

The present disclosure has been described in terms of one or more preferred embodiments, and it should be appreciated that many equivalents, alternatives, variations, and modifications, aside from those expressly stated, are possible and within the scope of the disclosure.

Each reference identified in the present application is herein incorporated by reference in its entirety.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

What is claimed is:

1. A wheel for a motor vehicle, the wheel comprising:
    an annular wheel rim having a first outer radius, $R^1$, extending from a center point of the wheel to an outer edge of the wheel rim;
    an annular wheel hub having a second outer radius, $R_2$, extending from the center point of the wheel to an outer edge of the wheel hub, the wheel hub positioned coaxially with the wheel rim and having a plurality of circumferentially positioned and equiangularly spaced bolt holes for attachment of the wheel to the motor vehicle; and a plurality of equiangularly spaced, Y-shaped spokes having a trunk portion contacting the wheel hub, two limb portions each contacting the wheel rim, and a branch point intermediate the trunk portion and limb portions, the spokes extending radially outward from the wheel hub to the wheel rim, wherein the bolt holes are interspaced between the trunk portions of the spokes, wherein the trunk portion and the limb portions converge at the branch point, wherein a distance between the center point of the wheel and the branch point is $D_1$, wherein $R_2/R_1$ is between 0.2 and 0.4, wherein $D_1/R_1$ is between 0.4 and 0.6, and wherein an internal angle between the two limb portions of each Y-shaped spoke is between 100 degrees and 120 degrees.

2. The wheel of claim 1, the wheel rim further having an inner radius, $R_3$, extending from the center point of the wheel to an inner edge of the wheel rim and $R_3/R_1$ is between 0.8 and 0.9.

3. The wheel of claim 1, wherein a lateral stiffness of the wheel is at least about 4000 kN/mm.

4. The wheel of claim 1, wherein the limb portions of the spokes are at least partially machined.

5. The wheel of claim 1, wherein the limb portions of the spokes have substantially rectangular cross-sectional profile.

6. The wheel of claim 1, the wheel rim further including a body extending between a first end and a second end, the first end and second end of the wheel rim shaped to mount a tire, the body of the wheel rim including an exterior surface, the exterior surface at least partially defining an acoustic cavity with the tire, wherein the acoustic cavity has a characteristic frequency range between an upper frequency bound and a lower frequency bound, wherein a first natural frequency mode of the wheel is less than the lower frequency bound, and wherein a second natural frequency mode of the wheel is greater than the upper frequency bound.

7. The wheel of claim 6, wherein the upper frequency bound is about 340 Hz, and the lower frequency bound is about 175 Hz.

8. The wheel of claim 1, wherein a total weight of the wheel is less than about 11 kg.

9. The wheel of claim 1, wherein the wheel includes one of three, five, seven and nine Y-shaped spokes.

10. A wheel for a motor vehicle, the wheel comprising:

an annular wheel rim having a body extending between a first end and a second end, the first end and second end of the wheel rim shaped to mount a tire, the body of the wheel rim including an exterior surface, the exterior surface at least partially defining an acoustic cavity with the tire;

an annular wheel hub, the wheel hub positioned coaxially with the wheel rim and having a plurality of circumferentially positioned and equiangularly spaced bolt holes for attachment of the wheel to the motor vehicle; and a plurality of equiangularly spaced, Y-shaped spokes having a trunk portion contacting the wheel hub, two limb portions each contacting the wheel rim, and a branch point intermediate the trunk portion and limb portions, the spokes extending radially outward from the wheel hub to the wheel rim, wherein the acoustic cavity has a characteristic frequency range between an upper frequency bound and a lower frequency bound, wherein a first natural frequency mode of the wheel is less than the lower frequency bound, and wherein a second natural frequency mode of the wheel is greater than the upper frequency bound.

11. The wheel of claim 10, wherein the wheel rim further includes a first outer radius, $R_1$, extending from a center point of the wheel to an outer edge of the wheel rim, wherein the wheel hub further includes a second outer radius, $R_2$, extending from the center point of the wheel to an outer edge of the wheel hub, and wherein $R_2/R_1$ is between 0.2 and 0.4.

12. The wheel of claim 11, wherein the trunk portion and the limb portions converge at the branch point, wherein a distance between the center point of the wheel and the branch point is $D_1$, wherein $D_1/R_1$ is between 0.4 and 0.6.

13. The wheel of claim 10, wherein an internal angle between the two limb portions of each Y-shaped spoke is between 100 degrees and 120 degrees.

14. The wheel of claim 10, wherein the bolt holes are interspaced between the trunk portions of the spokes.

15. The wheel of claim 10, wherein a total weight of the wheel is less than about 11 kg.

16. The wheel of claim 10, wherein a lateral stiffness of the wheel is at least about 4000 kN/mm.

17. A wheel for a motor vehicle, the wheel comprising:

an annular wheel rim;

an annular wheel hub positioned coaxially with the wheel rim and having a plurality of circumferentially positioned and equiangularly spaced bolt holes for attachment of the wheel to the motor vehicle;

a plurality of equiangularly spaced, Y-shaped spokes having a trunk portion contacting the wheel hub, two limb portions each contacting the wheel rim, and a branch point intermediate the trunk portion and limb portions, the spokes extending radially outward from the wheel hub to the wheel rim;

wherein a total weight of the wheel is less than about 11 kg, and wherein a lateral stiffness of the wheel is at least about 4000 kN/mm.

18. The wheel of claim 17, wherein a total weight of the wheel is less than about 11 kg.

19. The wheel of claim 17, wherein a lateral stiffness of the wheel is at least about 4000 kN/mm.

20. The wheel of claim 17, wherein the wheel rim further includes a first outer radius, $R_1$, extending from a center point of the wheel to an outer edge of the wheel rim, wherein the wheel hub further includes a second outer radius, $R_2$, extending from the center point of the wheel to an outer edge of the wheel hub, and wherein $R_2/R_1$ is between 0.2 and 0.4, wherein the trunk portion and the limb portions converge at the branch point, wherein a distance between the center point of the wheel and the branch point is $D_1$, wherein $D_1/R_1$ is between 0.4 and 0.6, wherein an internal angle between the two limb portions of each Y-shaped spoke is between 100 degree and 120 degrees, and wherein the bolt holes are interspaced between the trunk portions of the spokes.

* * * * *